United States Patent
Henry et al.

(10) Patent No.: US 10,805,623 B2
(45) Date of Patent: Oct. 13, 2020

(54) METHOD FOR ENCODING AND DECODING DATA, DEVICE FOR ENCODING AND DECODING DATA, AND CORRESPONDING COMPUTER PROGRAMS

(71) Applicant: Orange, Paris (FR)

(72) Inventors: Felix Henry, Saint Gregoire (FR); Gordon Clare, Pace (FR)

(73) Assignee: ORANGE, Paris (FR)

( * ) Notice: Subject to any disclaimer, the term of this patent is extended or adjusted under 35 U.S.C. 154(b) by 84 days.

(21) Appl. No.: 16/073,917

(22) PCT Filed: Jan. 17, 2017

(86) PCT No.: PCT/FR2017/050094
§ 371 (c)(1),
(2) Date: Jul. 30, 2018

(87) PCT Pub. No.: WO2017/129880
PCT Pub. Date: Aug. 3, 2017

(65) Prior Publication Data
US 2019/0045205 A1    Feb. 7, 2019

(30) Foreign Application Priority Data
Jan. 29, 2016    (FR) ...................... 16 50758

(51) Int. Cl.
*H04N 19/44*    (2014.01)
*H04N 19/46*    (2014.01)
(Continued)

(52) U.S. Cl.
CPC ............. *H04N 19/44* (2014.11); *H04N 19/13* (2014.11); *H04N 19/136* (2014.11);
(Continued)

(58) Field of Classification Search
CPC ...... H04N 19/18; H04N 19/44; H04N 19/122; H04N 19/124
See application file for complete search history.

(56) References Cited

U.S. PATENT DOCUMENTS 8,774,538 B2 * 7/2014 Nassor ................ G06K 9/36
                                                        382/233
9,497,480 B2 * 11/2016 Suzuki ................ H04N 19/46
(Continued)

OTHER PUBLICATIONS

Adaptive Quantization Matrices for High Definition Resolutions in Scalable HEVC; Prangnell; 2016 (Year: 2016).*
(Continued)

*Primary Examiner* — Luis Perez-Fuentes
(74) *Attorney, Agent, or Firm* — David D. Brush; Westman, Champlin & Koehler, P.A.

(57) ABSTRACT

A method for decoding a signal of encoded digital data, which includes, for at least one part of the signal: determining information representing a characteristic of the encoded data contained in the at least one signal part; determining first and second values of at least one datum required for the decoding of the data; decoding the data based on the first value to obtain a first characteristic of the decoded data; decoding the data based on the second value to obtain a second characteristic of the decoded data; selecting the first or the second value according to the information representing a characteristic of the encoded data and according to the first and second characteristics of the decoded data; and reconstructing the data based on the first or the second value, which has been selected.

8 Claims, 6 Drawing Sheets

(51) Int. Cl.

| | |
|---|---|
| *H04N 19/70* | (2014.01) |
| *H04N 19/18* | (2014.01) |
| *H04N 19/136* | (2014.01) |
| *H04N 19/13* | (2014.01) |
| *H04N 19/176* | (2014.01) |
| *H04N 19/91* | (2014.01) |

(52) U.S. Cl.
CPC .......... *H04N 19/176* (2014.11); *H04N 19/18* (2014.11); *H04N 19/46* (2014.11); *H04N 19/70* (2014.11); *H04N 19/91* (2014.11)

(56) References Cited

U.S. PATENT DOCUMENTS

| | | | | |
|---|---|---|---|---|
| 9,571,833 | B2* | 2/2017 | Bici | H04N 19/521 |
| 9,648,316 | B2* | 5/2017 | Tanaka | H04N 19/18 |
| 9,716,894 | B2* | 7/2017 | Joshi | H04N 19/70 |
| 9,854,275 | B2* | 12/2017 | Joshi | H04N 19/147 |
| 9,866,839 | B2* | 1/2018 | Lim | H04N 19/196 |
| 10,063,885 | B2* | 8/2018 | Nakamura | H04N 19/109 |
| 10,230,956 | B2* | 3/2019 | Hebel | H04N 19/103 |
| 10,271,065 | B2* | 4/2019 | Murakami | H04N 19/56 |
| 10,306,251 | B2* | 5/2019 | Yasugi | H04N 19/176 |
| 10,477,245 | B2* | 11/2019 | Li | H04N 13/161 |
| 2013/0188698 | A1* | 7/2013 | Chien | H04N 19/176 |
| | | | | 375/240.12 |
| 2014/0198841 | A1* | 7/2014 | George | H04N 19/13 |
| | | | | 375/240.03 |
| 2015/0195568 | A1 | 7/2015 | Henry et al. | |
| 2019/0320177 | A1* | 10/2019 | George | H04N 19/70 |

OTHER PUBLICATIONS

Quantization matrix in HEVC; Zhou; 2011; (Year: 2011).*
Carriage of large block size quantization matrix; Zhou; 2011; (Year: 2011).*
Compact Representation of Quantization Matrices for HEVC; Zhou; 2011; (Year: 2011).*
Enhancements of HEVC Quantization Matrix; Morigami; 2012; (Year: 2012).*
International Search Report dated May 4, 2017 for corresponding International Application No. PCT/FR2017/050094, filed Jan. 17, 2017.
English translation of the International Written Opinion dated May 12, 2017 for corresponding International Application No. PCT/FR2017/050094, filed Jan. 17, 2017.
Jianle Chen et al., "Non-CE1: throughput improvement on CABAC coefficients level coding", Joint Collaborative Team on Video Coding (JCT-VC) of ITU-T SG16 WP3 and ISO/IEC JTC1/SC29/WG11, 8th Meeting: San Jose, CA, USA, Feb. 1-10, 2012.
Felix Henry, "Residual Coefficient Sign Prediction", Joint Video Exploartion Team (JVET) of ITU-T SG 16 WP 3 and ISO/IEC JTC1/SC29/WG11, 4th Meeting: Chengdu, CN, Oct. 15-21, 2016.
Jean-Marc Thiesse et al. "Rate Distortion Data Hiding of Motion Vector Competition Information in Chroma and Luma Samples for Video Compression." IEEE Transactions on Circuits and Systems for Video Technology, IEEE Service Center, Piscataway, NJ, US, vol. 21, No. 6. Jun. 1, 2011.
Wen Yang et al. "Motion vector coding algorithm based on adaptive template matching". 2010 IEEE International Workshop on Multimedia Signal Processing (MMSP'10), Saint Malo, France, Oct. 4-6, 2010, IEEE, Piscataway, USA. Oct. 4, 2010.

* cited by examiner

METHOD FOR ENCODING AND DECODING DATA, DEVICE FOR ENCODING AND DECODING DATA, AND CORRESPONDING COMPUTER PROGRAMS

CROSS-REFERENCE TO RELATED APPLICATIONS

This Application is a Section 371 National Stage Application of International Application No. PCT/FR2017/050094, filed Jan. 17, 2017, which is incorporated by reference in its entirety and published as WO 2017/129880 A1 on Aug. 3, 2017, not in English.

FIELD OF THE INVENTION

The present invention pertains generally to the field of the coding and decoding of data.

The invention may thus in particular apply to the coding of digital images and of sequences of digital images, such as implemented in current AVC (the abbreviation standing for "Advanced Video Coding") and HEVC (the abbreviation standing for "High Efficiency Video Coding") video coders and their extensions (MVC, 3D-AVC, MV-HEVC, 3D-HEVC, etc. . . . ), and to the corresponding decoding.

BACKGROUND OF THE INVENTION

Current video coders (MPEG, H.264, HEVC, . . . ) use a block-wise representation of the video sequence. The images are split up into blocks, which may be split up again in a recursive manner. Next, each block is coded by intra-image or inter-image prediction. Thus, certain images are coded by spatial prediction (Intra prediction), other images are also coded by temporal prediction (Inter prediction) with respect to one or more coded-decoded reference images, with the aid of a motion compensation known by the person skilled in the art.

A residual block, also called a prediction residual, corresponding to the original block decreased by a prediction, is coded for each block. The residual blocks are transformed with the aid of a mathematical transform operation, and then quantized with the aid of a mathematical quantization operation for example of scalar type. A one-dimensional list of coefficients is obtained on completion of the quantization.

The coefficients of this list are then coded in the form of bits by an entropy coding whose aim is to code the coefficients without loss.

The bits obtained after entropy coding are written into a data signal or stream which is intended to be transmitted to the decoder.

In a manner known per se, such a signal comprises:
the quantized coefficients contained in the aforementioned list,
information representative of the mode of coding used, in particular:
  the mode of prediction (Intra prediction, Inter prediction, default prediction carrying out a prediction for which no information is transmitted to the decoder (known as "skip"));
  information specifying the type of prediction (orientation, reference image, . . . );
  the type of splitting of the block;
  the motion information if necessary;
  etc.

Once the stream has been received by the decoder, the decoding is done image by image, and for each image, block by block. For each block, the corresponding elements of the stream are read. The inverse quantization, the inverse scan operation, and the inverse transform of the coefficients of the blocks are performed so as to produce the decoded prediction residual. Next, the prediction of the block is calculated and the block is reconstructed by adding the prediction to the decoded prediction residual.

More particularly during data coding of HEVC type, the aforementioned entropy coding, which may be for example of arithmetical or Huffman type, is performed in the following manner:
  a significance information item, indicating whether each coefficient is or is not zero, is coded. A syntax element "significant_coeff=0" is compressed by entropy coding if the coefficient is zero. A syntax element "significant_coeff=1" is compressed by entropy coding if the coefficient is non-zero;
  for each non-zero coefficient, a syntax element "greater_than_one" is coded by entropy coding, which indicates whether the current coefficient is greater than 1:
  for each coefficient for which the syntax element "greater_than_one" equals 1, a syntax element "greater_than_two" is coded by entropy coding, which indicates whether the current coefficient is greater than 2;
  for each coefficient for which the syntax element "greater_than_two" equals 1, a "remaing_level" syntax element is coded by entropy coding, which indicates the amplitude of the coefficient, decreased by 3;
  for each non-zero coefficient, a "sign" syntax element is coded by entropy coding, which indicates the sign of this element.

A drawback of such a coding is that the coded data signal to be transmitted to a decoder contains a non-negligible number of data, thus not making it possible to optimize the reduction in the compression gain of the coded data. This results in unsatisfactory compression performance.

SUBJECT AND SUMMARY OF THE INVENTION

One of the aims of the invention is to remedy the drawbacks of the aforementioned prior art.

For this purpose, a subject of the present invention relates to a method for coding data in the form of a data signal, which is noteworthy in that, for a current data set, it implements the following:
  coding of the data of the set, with the exception of at least one data item of the set,
  determination of an information item representative of a characteristic of the coded data, the information item being intended to allow the reconstruction of all the data of the set,
  formulation of at least one signal part containing the data of the set which have been coded.

Such a provision advantageously makes it possible to apply on coding a technique for omitting data to a large number of data contained in a data set to be coded, as a function of the value of an information item representative of a characteristic of the coded data of this set, which information item will allow the decoder to retrieve all the data which were omitted during coding. It is thus possible, by hiding these numerous data, to substantially reduce the signaling cost.

Such an information item representative of a characteristic of the coded data of said data set consists for example in the number of coded data, in the parity of the sum of coded data, in the size of the set of coded data, in the number of non-zero data of this set.

In a particular embodiment, the coding method according to the invention comprises, subsequent to the coding of the data of the data set, with the exception of the at least one data item of the set, the following:

- determination of at least one first and one second value of at least one data item necessary for the decoding of the coded data,
- decoding of the data contained in the at least one signal part, on the basis of the first value of the at least one data item, on completion of which is obtained a first characteristic of the decoded data,
- decoding of the data contained in the at least one signal part, on the basis of the second value of the at least one data item, on completion of which is obtained a second characteristic of the decoded data,
- comparison of each of the first and second characteristics of the decoded data with the information item representative of a characteristic of the coded data,
- in the case where each of the first and second characteristics of the decoded data is equal to the information item representative of a characteristic of the coded data, selection of that of the first and second values of the at least one data item which is necessary for the decoding of the coded data, which allows error-free reconstruction of the data of the set,
- during the formulation of the signal part, insertion into the signal part of an information item representative of the selection implemented.

Such a provision allows the coder to resolve the conflict which may appear on completion of the comparison, in the case where the first and second characteristics of the decoded data are both equally compatible with the information item representative of a characteristic of the coded data.

For this purpose, the coder simulates a first type and a second type of decoding of the coded data contained in the signal part, so as to select, from among the first and the second type of decoding, the one which is compatible with the information item representative of a characteristic of the coded data.

In an advantageous manner, an information item representative of this selection is inserted into the data signal to be transmitted to the decoder.

Correlatively, the invention further relates to a device for coding data in the form of a data signal, which is noteworthy in that it comprises a processing circuit which, for a current data set, is designed to:

- code the data of the set, with the exception of at least one data item of said set,
- determine an information item representative of a characteristic of the coded data, the information item being intended to allow the reconstruction of all the data of the set,
- formulate at least one signal part containing the data of the set which have been coded.

In a corresponding manner, the invention relates to a method for decoding a coded data signal, which is noteworthy in that, for at least one part of the signal, it implements the following:

- determination of an information item representative of a characteristic of the coded data which are contained in the at least one signal part,
- determination of at least one first and one second value of at least one data item which is necessary for the decoding of the data of the at least one signal part,
- decoding of the data contained in the at least one signal part on the basis of the first value of the at least one data item, on completion of which is obtained a first characteristic of the decoded data,
- decoding of the data contained in the at least one signal part on the basis of the second value of the at least one data item, on completion of which is obtained a second characteristic of the decoded data,
- selection of the first or of the second value of the at least one data item, as a function of the information item representative of a characteristic of the coded data which are contained in the at least one signal part and as a function of the first and second characteristics of the decoded data,
- reconstruction of the data of the at least one signal part on the basis of the first or of the second value of the at least one data item, which has been selected.

Such a provision advantageously allows the decoder to reconstruct in an autonomous manner all the data associated with the at least one signal part which have not been coded and which have been omitted by the coder, by virtue:

- of the determination of the information item representative of a characteristic of the coded data which are contained in the at least one signal part, and then
- of the selection, from among at least two possible decoding combinations implemented at the decoder, of the correct combination of decoding not giving rise to any desynchronization with respect to the coder, on the basis of this determined information item.

The information item representative of a characteristic of the coded data which are contained in the at least one signal part can according to the coding/decoding context:

- either be read by the decoder in the at least one signal part,
- or be deduced by the decoder, if for example the at least one signal part is the last part of the data signal that must be decoded by the decoder.

In a particular embodiment, the selection of the first or of the second value of the at least one data item which is necessary for the decoding of the data of the at least one signal part is implemented:

- by comparing each of the first and second characteristics of the decoded data with the information item representative of a characteristic of the coded data which are contained in the at least one signal part, which has been determined,
- by selecting, from among the first and second characteristics of the decoded data, that which is equal to the information item representative of a characteristic of the coded data which are contained in the at least one signal part.

The decoder thus implements a comparison of the information item representative of a characteristic of the coded data which are contained in the at least one signal part with the results of at least two possible combinations of decoding of the data of the at least one signal part, so as to select the correct combination, that is to say the one which is the most compatible with this information item.

In a particular embodiment, in the case where each of the first and second characteristics of the decoded data is equal to the information item representative of a characteristic of the coded data which are contained in the at least one signal part, the selection of the first or of the second value of the at least one data item which is necessary for the decoding of the data of the at least one signal part is implemented by determining, in the at least one signal part, an information item representative of the selection to be applied between the first or the second value.

Such a provision advantageously allows the decoder to identify directly in the at least one signal part received, the correct decoding combination to be applied.

Correlatively, the invention further relates to a device for decoding a coded data signal, which is noteworthy in that it comprises a processing circuit which, for at least one part of the signal, is designed to:

- determine an information item representative of a characteristic of the coded data which are contained in the at least one signal part,
- determine at least one first and one second value of at least one data item which is necessary for the decoding of the data of the at least one signal part,
- decode the data contained in the at least one signal part on the basis of the first value of the at least one data item, on completion of which is obtained a first characteristic of the decoded data,
- decode the data contained in the at least one signal part on the basis of the second value of the at least one data item, on completion of which is obtained a second characteristic of the decoded data,
- select the first or the second value of the at least one data item, as a function of the information item representative of a characteristic of the coded data which are contained in the at least one signal part and as a function of the first and second characteristics of the decoded data,
- reconstruct the data of the at least one signal part on the basis of the first or of the second value of the at least one data item, which has been selected.

The various aforementioned modes or characteristics of embodiment can be added independently or in combination with one another, to the operations implemented in the course of the decoding method such as is defined hereinabove.

The invention also envisages a computer program comprising instructions for the execution of the steps of the coding or decoding method hereinabove, when the program is executed by a computer.

Such a program can use any programming language, and be in the form of source code, object code, or of code intermediate between source code and object code, such as in a partially compiled form, or in any other desirable form.

Yet another subject of the invention also envisages a recording medium readable by a computer, and comprising instructions of computer programs such as mentioned hereinabove.

The invention also envisages a recording medium readable by a computer on which is recorded a computer program, this program comprising instructions suitable for the implementation of the coding or decoding method according to the invention, such as are described hereinabove.

The recording medium can be any entity or device capable of storing the program. For example, the medium can comprise a storage means, such as a ROM, for example a CD ROM or a microelectronic circuit ROM, a USB key, or a magnetic recording means, for example a hard disk.

Moreover, the recording medium can be a transmissible medium such as an electrical or optical signal, which can be conveyed via an electrical or optical cable, by radio or by other means. The program according to the invention may in particular be downloaded from a network of Internet type.

Alternatively, the recording medium can be an integrated circuit into which the program is incorporated, the circuit being suitable for executing or for being used in the execution of the aforementioned coding or decoding method.

BRIEF DESCRIPTION OF THE DRAWINGS

Other characteristics and advantages will become apparent on reading a preferred embodiment described with reference to the figures in which.

DETAILED DESCRIPTION OF THE CODING PART

Generally, the present invention applies to the coding of various types of digital data, such as for example audio data, image data or else video data.

According to one embodiment of the invention, the method for coding data which will now be described is used to code an image according to a binary data signal close to that obtained by a coding compliant with any one of the current or forthcoming video coding standards.

Figure 1:
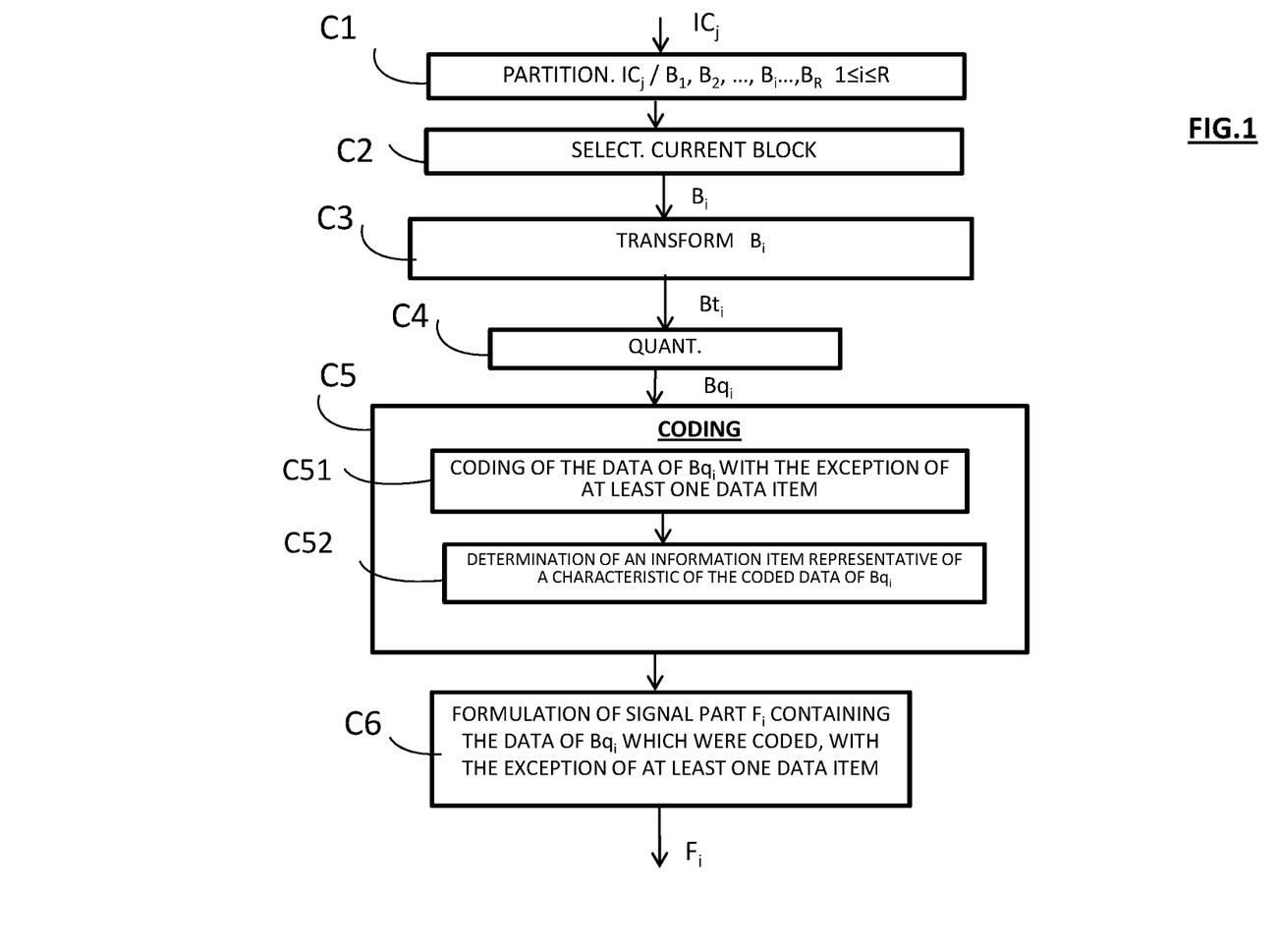
FIG. 1 represents the main steps of the coding method according to the invention.

In this embodiment, the coding method according to the invention is for example implemented in a software or hardware manner by modifications of a coder initially compliant with the HEVC standard. The coding method according to the invention is represented in the form of an algorithm comprising steps C1 to C6 such as represented in FIG. 1.

Figure 3:
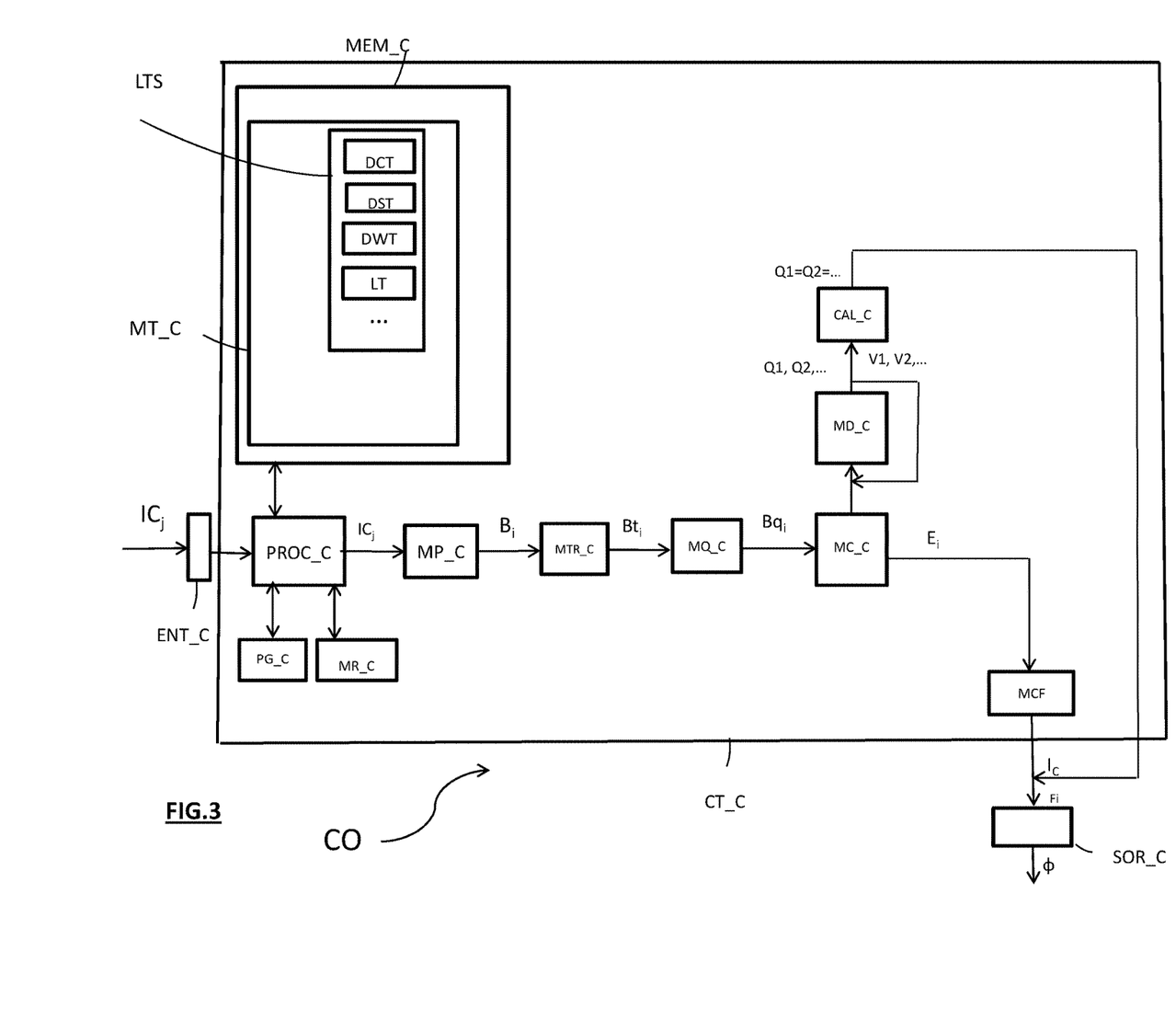
FIG. 3 represents an embodiment of a coding device according to the invention.

According to the embodiment of the invention, the coding method according to the invention is implemented in a coding device CO represented in FIG. 3.

As illustrated in FIG. 3, such a coder device comprises:
- an input ENT_C for receiving a current image to be coded,
- a processing circuit CT_C for implementing the coding method according to the invention, the processing circuit CT_C containing:
  - a memory MEM_C comprising a buffer memory MT_C,
  - a processor PROC_C driven by a computer program PG_C,
- an output SOR_C for delivering a coded signal containing the data obtained on completion of the coding of the current image.

On initialization, the code instructions of the computer program PG_C are for example loaded into a RAM memory, MR_C, before being executed by the processing circuit CT_C.

The coding method represented in FIG. 1 applies to any current image $IC_j$ which is a still or else which forms part of a sequence of L images $IC_1, \ldots, IC_j, \ldots, IC_L$ ($1 \leq j \leq L$) to be coded.

In the course of a step C1 represented in FIG. 1, there is undertaken, in a manner known per se, the partitioning of a current image $IC_j$ into a plurality of data set $B_1, B_2, \ldots, B_i, \ldots, B_R$ ($1 \leq i \leq R$) which are blocks of pixels, for example of size 4×4 pixels. Such a partitioning step is implemented by a partitioning device MP_C represented in FIG. 2, which device is driven by the processor PROC_C.

It should be noted that in the sense of the embodiment described here, the term "block" signifies coding unit. The latter terminology is in particular used in the HEVC standard "ISO/IEC/23008-2 Recommendation ITU-T H.265 High Efficiency Video Coding (HEVC)".

In particular, such a coding unit groups together sets of pixels of rectangular or square shape, also called blocks or macroblocks.

Such a coding unit could, in a future standard, also group together sets of pixels exhibiting other geometric shapes.

Said blocks $B_1, B_2, \ldots, B_i, \ldots, B_R$ are intended to be coded according to a predetermined order of scan, which is for example of the lexicographic type. This signifies that the blocks are coded one after another, from left to right, and then from top to bottom.

Other types of scan are of course possible. Thus, it is possible to split the image $IC_j$ into several sub-images called slices and to apply a splitting of this type to each sub-image independently. It is also possible to code not a succession of lines, as explained hereinabove, but a succession of columns. It is also possible to scan the lines or columns in either direction.

Moreover, each block can itself be divided into sub-blocks which are themselves subdivisible.

In the course of a step C2 represented in FIG. 1, the coder CO selects as current block a first block to be coded $B_i$ of the image $IC_j$, such as for example the first block $B_1$.

In the course of a step C3 of FIG. 1, there is undertaken the application of a transform to the data of the current block $B_i$.

In the example described here, data is intended to mean the pixels of the current block $B_i$.

It should however be noted that data is also intended to mean the pixels of a predicted block obtained with the aid of a prediction of the current block $B_i$ with respect to a predictor block which is selected subsequent to setting various inter, intra or other predetermined modes of prediction into competition, for example by minimizing a distortion bitrate criterion well known to the person skilled in the art.

In a manner known per se, as a function of the context or of the coding standard used, such a transform is for example a transform of DCT (the abbreviation standing for "Discrete Cosine Transform"), DST (the abbreviation standing for "Discrete Sine Transform") type, of DWT (the abbreviation standing for "Discrete Wavelet Transform") type or else of LT (the abbreviation standing for "Lapped Transform") type. These transforms are stored previously in a list LTS, in the buffer memory MT_C of the coder CO of FIG. 2.

On completion of step C3, a transformed data block $Bt_i$ is obtained.

Such an operation is performed by a transform calculation device MTR_C, such as represented in FIG. 3, which device is driven by the processor PROC_C.

In the course of a step C4 represented in FIG. 1, there is undertaken the quantization of the data of the transformed block $Bt_i$ according to a conventional quantization operation, such as for example a scalar or vector quantization. A block $Bq_i$ of quantized coefficients is then obtained.

Step C4 is implemented by a quantization device MQ_C such as represented in FIG. 3, which device is driven by the processor PROC_C.

In the course of a step C5 represented in FIG. 1, there is undertaken the coding of the data of the block $Bq_i$ of quantized coefficients. Step C5 is implemented by a coding device MC_C represented in FIG. 3, which device is driven by the processor PROC_C.

More particularly during data coding of HEVC type, which may be for example of arithmetical or Huffman type, the data of the quantized block $Bq_i$ that are able to be coded are determined in the following manner:
 a significance data item, indicating whether each coefficient is or is not zero. This data item is a syntax element "significant_coeff" which is set to 0 if the coefficient is zero or which is set to 1 if the coefficient is non-zero;
 for each non-zero coefficient, a data item "greater_than_one" which is a syntax element indicating whether the current coefficient of the quantized current block $Bq_i$ is strictly greater than 1;
 for each coefficient for which the syntax element "greater_than_one" equals 1, a data item "greater_than_two" which is a syntax element indicating whether the current coefficient is strictly greater than 2;
 for each coefficient for which the syntax element "greater_than_two" equals 1, a "remaing_level" data item which is a syntax element indicating the amplitude of the coefficient, decreased by 3;
 for each non-zero coefficient, a "sign" data item which is a syntax element indicating the sign of the non-zero coefficient considered.

In the course of a sub-step C51 of FIG. 1, there is undertaken the coding of the coefficients of the quantized block $Bq_i$, with the exception of at least one data item of the latter. A set $E_i$ of coded data is then obtained.

According to the invention, the choice of said at least one data item of the quantized block $Bq_i$ not to be coded is predetermined at the coder.

For example, in the case of an HEVC coding, said at least one data item which is not coded is for example the first syntax element "greater_than_one". According to the coding context, a predetermined choice such as this may pertain to the second syntax element "greater_than_one", the first two syntax elements "greater_than_one", etc. . . .

In the example represented, it is considered that the first syntax element "greater_than_one" has a value V1.

Alternatively, it may be the syntax element "greater_than_two", the syntax element "significant_coeff", the syntax element "remaining_level" or else the syntax element "sign". In an alternative embodiment, it may be another syntax element, such as an intra prediction mode, an intra or inter prediction mode indicator, or else a motion vector.

According to the invention, in the course of a sub-step C52 of FIG. 1 there is determined a "reference_trace" information item which is a syntax element representative of a characteristic of the coded data of the quantized block $Bq_i$.

According to an example, the syntax elements determined during the coding of the quantized block $Bq_i$ are counted and their number constitutes the "reference_trace" information item.

By way of variant, the "reference_trace" information item can indicate:
 either the number of bits produced after coding of the syntax elements,
 or the parity of the sum of the value of the syntax elements,
 or the size of the quantized block $Bq_i$,
 or the energy of the quantized block $Bq_i$.

Subsequent to sub-step C52, in the course of step C6 of FIG. 1, there is undertaken the construction of a data signal part $F_i$ which contains the coded data of the quantized block $Bq_i$, with the exception of said at least one data item of this block, such as the syntax element "greater_than_one" of value V1, in the example represented.

Step C6 is implemented by a data signal construction device MCF, such as represented in FIG. 3, which device is driven by the processor PROC_C.

The data signal part $F_i$ is thereafter delivered via the output SOR_C of the coder CO of FIG. 3. The signal part $F_i$ is either stored in the buffer memory MT_C of the coder CO, or transmitted through a communication network (not represented) to a remote terminal. The latter comprises a decoder DO, such as that represented in FIG. 6 and which will be described further on.

In a manner known per se, the data signal part $F_i$ furthermore comprises certain information encoded by the coder CO, such as the type of prediction (Inter or Intra) which has been optionally applied, and if relevant, the prediction mode selected, the index of the predictor block selected, the reference image index and the motion vector that are used in the mode of Inter prediction, an index $I_T$ associated with the transform applied in the course of the aforementioned step C3.

Furthermore, in step C6, according to a possible embodiment, the "reference_trace" information item is inserted, in compressed form or not, into the signal part According to an alternative embodiment, the "reference_trace" information item is not inserted into the signal part $F_i$.

The coding steps C1 to C6 of FIG. 1 are thereafter implemented for each of the blocks $B_1, B_2, \ldots, B_i, \ldots, B_R$ to be coded of the current image $IC_j$ considered, in a predetermined order which is for example lexicographic order. A coded data signal $\phi$ is then delivered via the output SOR_C of the coder CO of FIG. 3, said signal $\phi$ concatenating all the signal parts $F_1, F_2, \ldots, F_R$ corresponding respectively to the blocks $B_1, B_2, \ldots, B_i, \ldots, B_R$ which have been coded.

Figure 2:
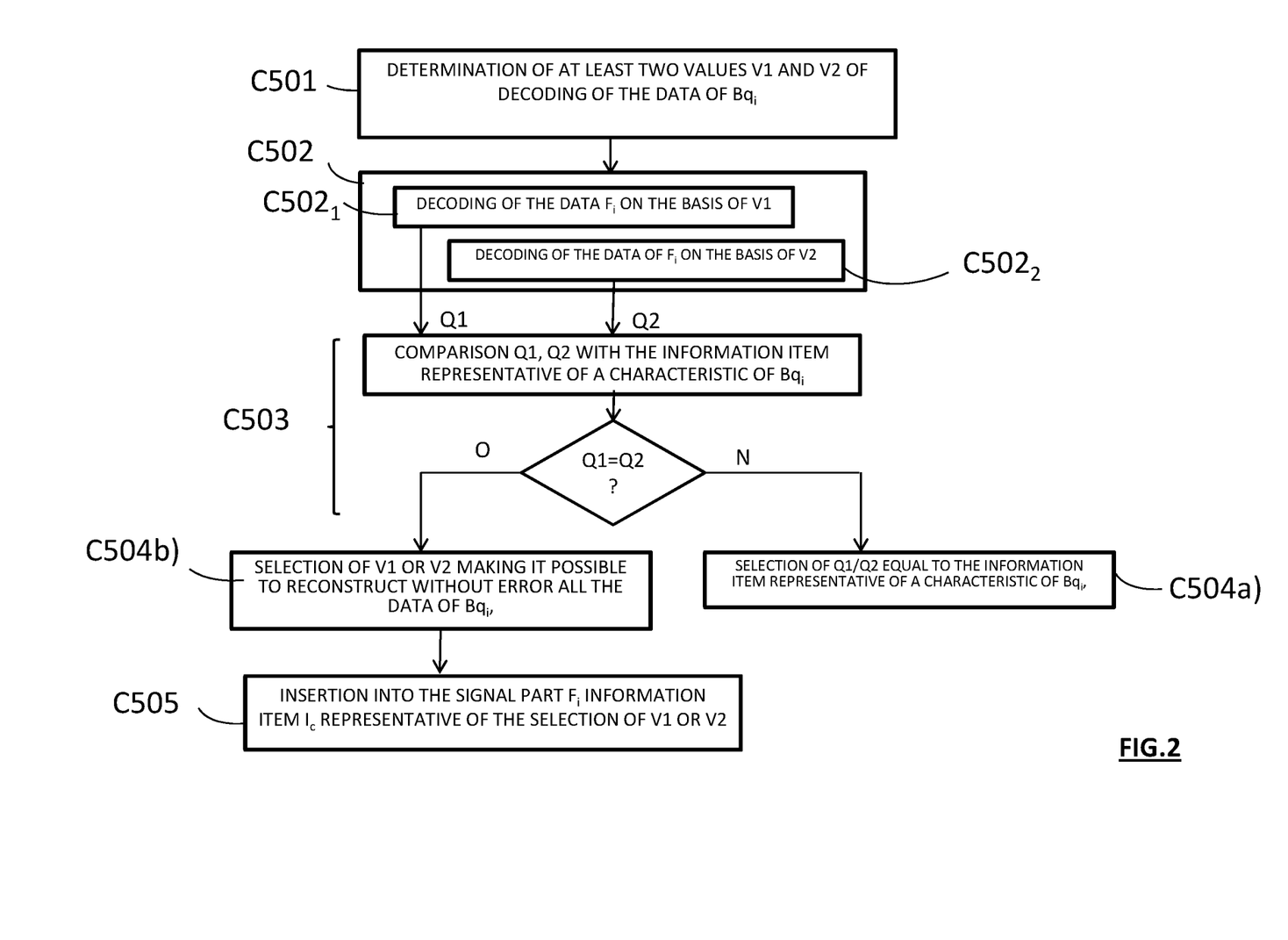
FIG. 2 represents an optional embodiment of the coding method of FIG. 1.

According to an optional embodiment represented in FIG. 2, when at least one data item of the current quantized block $Bq_i$ is not coded, in the course of a step C501, there is undertaken the determination of at least one first value V1 and one second value V2 of at least one data item necessary for the decoding of the data of the current quantized block $Bq_i$. Such a data item necessary for the decoding of the data of the current quantized block $Bq_i$ is, in the example represented, the syntax element "greater_than_one" which has the value V1.

Such a step is implemented by a decoding device MD_C represented in FIG. 3, which device is driven by the processor PROC_C.

In the course of a step C502 of FIG. 2, the decoding device MD_C of FIG. 3 undertakes:
  at $C502_1$, the decoding of the data contained in the signal part $F_i$, on the basis of the first value V1: a quantity Q1 of syntax elements is then obtained, which represents a first characteristic of the decoded data,
  at $C502_2$, the decoding of the data contained in the signal part $F_i$, on the basis of the second value V2: a quantity Q2 of syntax elements is then obtained, which represents a second characteristic of the decoded data.

Steps $C502_1$ and $C502_2$ can be implemented in any order.

In the course of a step C503 of FIG. 2, there is undertaken the comparison of the quantity of syntax elements Q1 and of the quantity of syntax elements Q2 with the "reference trace" information item.

In the case where the quantity of syntax elements Q1 is different from the quantity Q2 of syntax elements, in the course of a step C504a) of FIG. 2, there is undertaken the selection of the quantity of syntax elements Q1 or Q2 which is equal to the "reference_trace" information item.

In the case where the quantities Q1 and Q2 of syntax elements are both equal to the "reference_trace" information item, in the course of a step C504b) of FIG. 2, there is undertaken the selection of the first value V1 or of the second value V2 of the data item which makes it possible to reconstruct without error the data of the current quantized block $Bq_i$.

In the example represented, it is the first value V1 of the syntax element "greater_than_one".

Steps C503 and C504a)/b) are implemented by a calculation device CAL_C represented in FIG. 3, which device is driven by the processor PROC_C.

In the course of a step C505 of FIG. 2, only in the case where the quantities Q1 and Q2 of syntax elements are both equal to the "reference_trace" information item, the data signal construction device MCF inserts, into the signal part $F_i$, an information item "combination_id", denoted $I_C$, so as to indicate the selection of the decoding value V1 made in step C504b).

We shall now describe an illustration of the optional embodiment described in FIG. 2.

For example, on the basis of the "reference_trace" information item, the decoding device MD_C of FIG. 3 decodes the syntax elements "significant_coeff" contained in the coded data set $E_i$ associated with the block $Bq_i$. On completion of this decoding, there is deduced the number of syntax elements "greater_than_one" which were not coded in step C51 of FIG. 1. If for example, there are four syntax elements "significant_coeff" which were decoded, it is determined, on completion of step C501, that there are therefore four syntax elements "greater_than_one" to be decoded.

In the course of step C501, are then generated $2^4$ possible combinations of decoding values of the data of the block $Bq_i$, i.e. sixteen values V1, V2, ..., V16, such as for example:

$$-V1 = \{0, 0, 0, 0\}$$

$$-V2 = \{0, 0, 0, 1\}$$

$$-V3 = \{0, 0, 1, 0\}$$

...

$$-V16 = \{1, 1, 1, 1\}.$$

For example, it is assumed that among these sixteen possible decoding values, it is the value V7, such as for example V7={0,1,1,0}, which allows error-free reconstruction of the data of the quantized block $Bq_i$.

In the course of step C502 of FIG. 2, the decoding device MD_C of FIG. 3 undertakes:
  at $C502_1$, the decoding of the data contained in the signal part $F_i$, on the basis of the first value V1: a quantity Q1 of syntax elements is then obtained, which represents a first characteristic of the decoded data,
  at $C502_2$, the decoding of the data contained in the signal part $F_i$, on the basis of the second value V2: a quantity Q2 of syntax elements is then obtained, which represents a second characteristic of the decoded data,
  . . .
  at $C502_{16}$, the decoding of the data contained in the signal part $F_i$, on the basis of the sixteenth value V16: a quantity Q16 of syntax elements is then obtained, which represents a sixteenth characteristic of the decoded data.

In the course of step C503 of FIG. 2, each of the quantities $Q_1, Q_2, \ldots, Q_{16}$ of syntax elements is compared with the value of the "reference_trace" information item.

If the sixteen quantities of syntax elements are all different, in the course of step C504$a$) of FIG. 2, there is selected the single quantity of syntax elements which is equal to the value of the "reference_trace" information item, i.e. the quantity of syntax elements $Q_7$ in the example represented.

If at least two quantities of syntax elements are equal, for example $Q_2$ and $Q_7$, in the course of step C504$b$) of FIG. 2, there is selected from among the decoding values V2 and V7, the value V7 which, alone, makes it possible to reconstruct without error the data associated with the current quantized block $Bq_i$.

In this case, in the course of step C505 of FIG. 2, the data signal construction device MCF inserts, into the signal part $F_i$, the information item "combination_id" representative of the selection of the decoding value V7.

Detailed Description of the Decoding Part

Generally, the present invention applies to the decoding of a signal of various type of coded digital data, such as for example audio data, image data or else video data.

According to one embodiment of the invention, the decoding method which will now be described is used to decode a data signal representative of an image or of a sequence of images, said signal being able to be decoded by a decoder compliant with any one of the current or forthcoming video decoding standards.

In this embodiment, the decoding method according to the invention is for example implemented in a software or hardware manner by modifications of such a decoder, complying for example with the HEVC standard.

Figure 4:
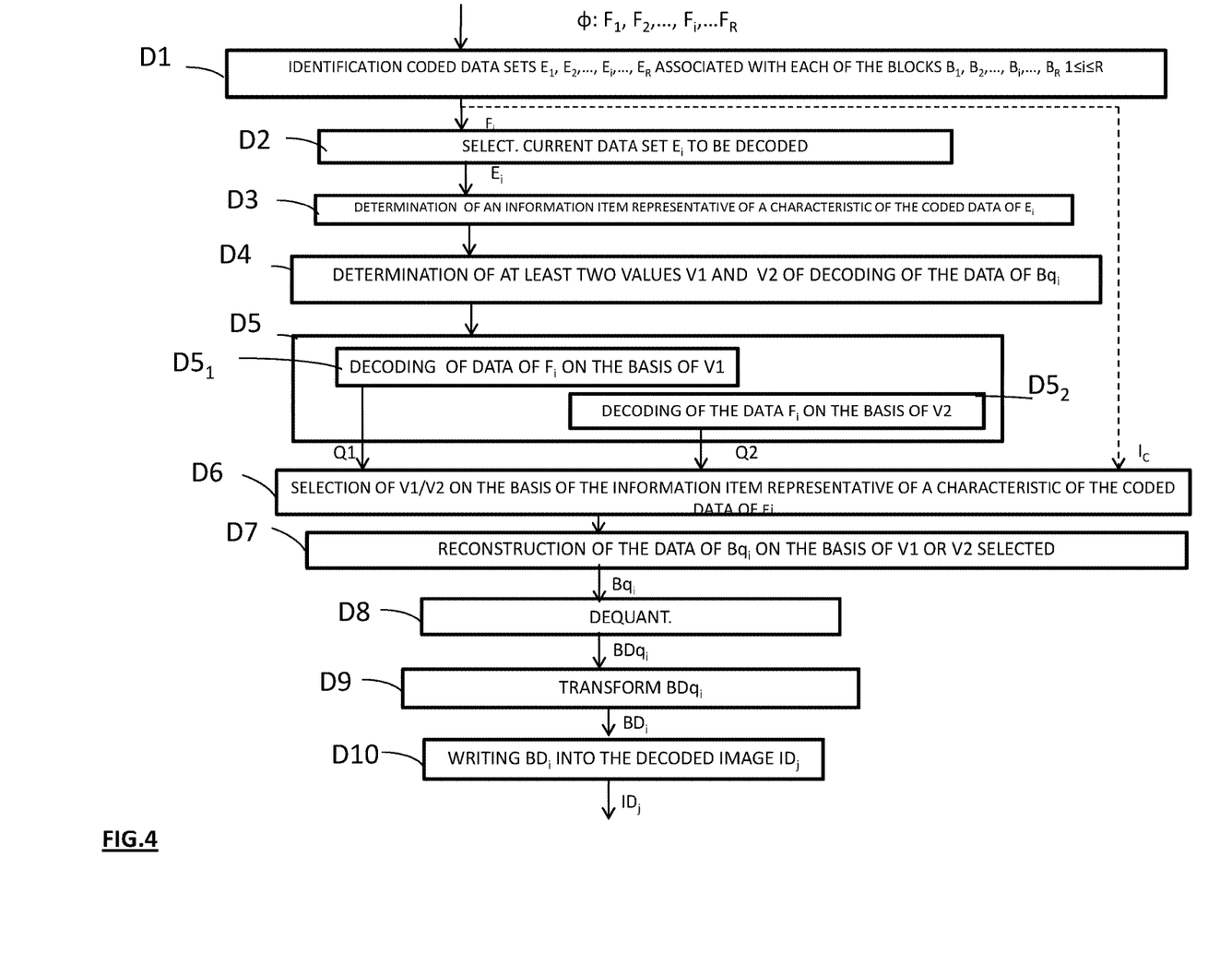
FIG. 4 represents the main steps of the decoding method according to the invention.

The decoding method according to the invention is represented in the form of an algorithm comprising steps D1 to D10 such as represented in FIG. 4.

Figure 6:
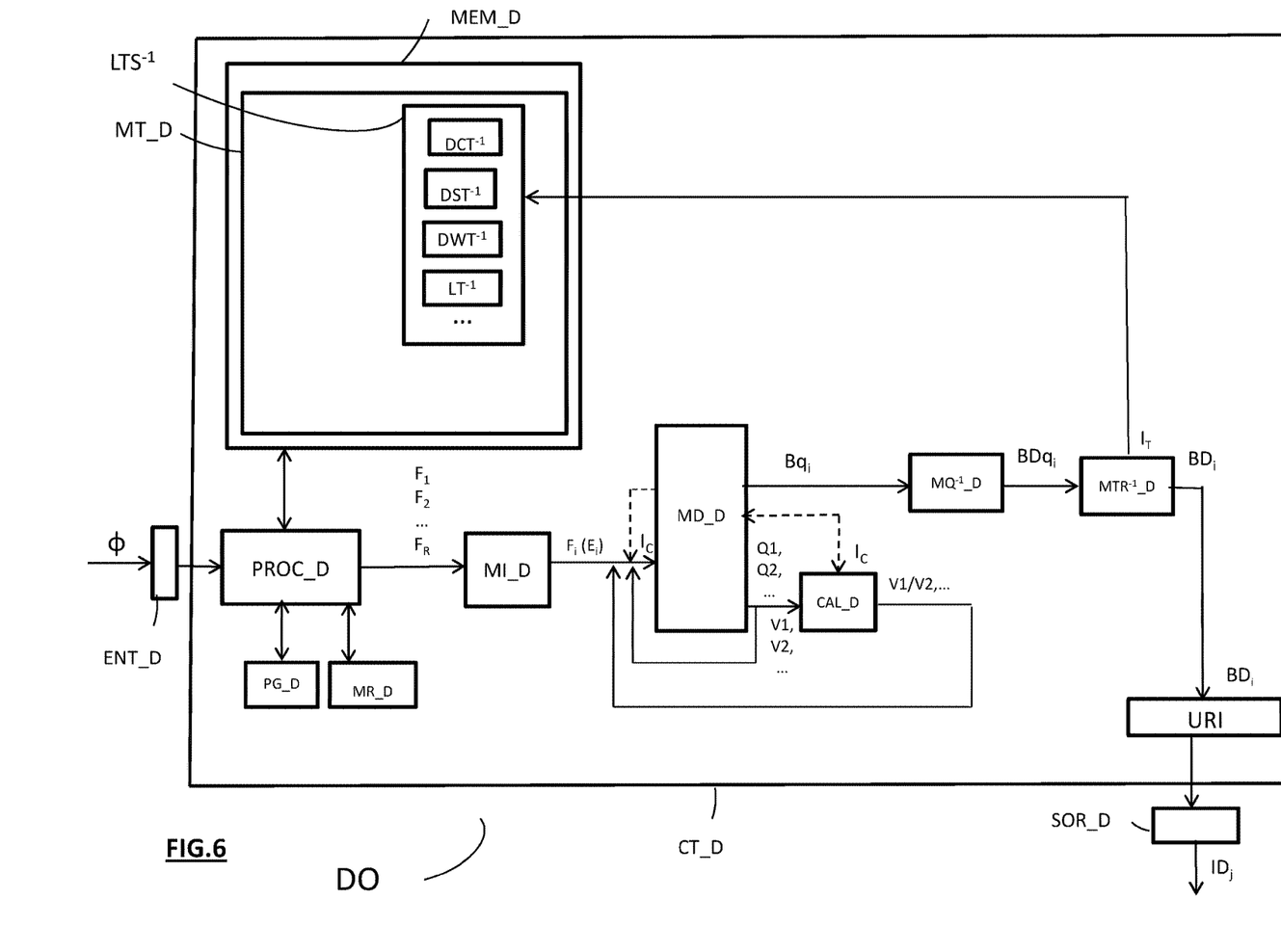
FIG. 6 represents an embodiment of a decoding device according to the invention.

According to this embodiment, the decoding method according to the invention is implemented in a decoding device or decoder DO represented in FIG. 6.

As illustrated in FIG. 6, such a decoder device comprises:
- an input ENT_D for receiving the data signal to be decoded,
- a processing circuit CT_D for implementing the decoding method according to the invention, the processing circuit CT_D containing:
  - a memory MEM_D comprising a buffer memory MT_D,
  - a processor PROC_D driven by a computer program PG_D,
- an output SOR_D for delivering a reconstructed current image containing the data obtained on completion of the decoding according to the method of the invention.

On initialization, the code instructions of the computer program PG_D are for example loaded into a RAM memory, MR_D, before being executed by the processing circuit CT_D.

The decoding method represented in FIG. 4 applies to a data signal $\phi$ representative of a current image $IC_j$ to be decoded which is a still or which belongs to a sequence of images to be decoded.

For this purpose, information items representative of the current image $IC_j$ to be decoded are identified in the data signal $\phi$ received at the input ENT_D of the decoder DO and such as is delivered on completion of the coding method of FIG. 1.

With reference to FIG. 4, in the course of a step D1, there is undertaken, in a manner known per se, the determination in the signal $\phi$ of the various signal parts $F_1, F_2, \ldots, F_i, \ldots, F_R$ corresponding respectively to each of the blocks $B_1, B_2, \ldots, B_i, \ldots, B_R$ previously coded in accordance with the aforementioned lexicographic order.

Such a determination step D1 is implemented by a stream analysis identification device MI_D, such as represented in FIG. 6, which module is driven by the processor PROC_D.

In the example represented, the blocks $B_1, B_2, \ldots, B_i, \ldots, B_R$ to be decoded are for example of size 4×4 pixels.

In the course of a step D2 represented in FIG. 4, the decoder DO of FIG. 6 selects, as current block $B_i$ to be decoded associated with the signal part $F_i$, the set $E_i$ of coded data which was obtained on completion of the coding method of FIG. 1 and optionally of FIG. 2.

In the course of a step D3 represented in FIG. 4, there is determined a "reference_trace" information item which, as was mentioned above with reference to the description of the coding method, is a syntax element representative of a characteristic of the data constituting the set $E_i$ of coded data.

Step D3 is implemented by a decoding device MD_D represented in FIG. 6, which device is driven by the processor PROC_D.

More particularly during data decoding of HEVC type, which may be for example of arithmetical or Huffman type, the "reference_trace" information item indicates for example the number of syntax elements which have been determined in the coding sub-step C51 of FIG. 1, such as "significant_coeff", "greater_than_one", "greater_than_two", "remaining_level" and "sign".

By way of variant, the "reference_trace" information item can indicate:
- either the number of bits produced after coding of the aforementioned syntax elements,
- or the parity of the sum of the value of the aforementioned syntax elements,
- or the size of the quantized block $Bq_i$ obtained on completion of step C4 of FIG. 1.

According to a possible embodiment, the "reference_trace" information item is read directly in the signal part $F_i$, and then optionally decompressed if this information item was compressed on coding.

According to an alternative embodiment, the "reference_trace" information item is deduced in an autonomous manner by the decoding device MD_D. Such a deduction is for example implemented in the case where the decoder DO decodes the last block $B_R$ of the current image $IC_j$. Indeed, in this specific case, and if the "reference_trace" information item indicates the number of syntax elements determined on coding for the block $B_R$, the number of syntax elements to be decoded contained in the corresponding signal part $F1_R$ of the coded data signal $\phi$ corresponds to the number of syntax elements that remain to be decoded in the signal $\phi$.

In the course of a step D4 represented in FIG. 4, the decoding device MD_D of FIG. 6 determines at least one first value V1 and one second value V2 of at least one data item necessary for the decoding of the data contained in the set $E_i$.

Such a data item necessary for the decoding of the data contained in the set $E_i$ is, in the example represented of an HEVC decoding, the first syntax element "greater_than_one" which has the value V1.

In a manner corresponding to the coder, the choice of such an at least one syntax element is predetermined at the decoder. According to the coding context, a predetermined choice such as this may pertain to the second syntax element "greater_than_one", the first two syntax elements "greater_than_one", etc. . . .

Alternatively, it may be the syntax element "greater_than_two", or else the syntax element "significant_coeff". In an alternative embodiment, it may be another syntax element, such as an intra prediction mode, an intra or inter prediction mode indicator, or else a motion vector.

In the course of a step D5 of FIG. 4, the decoding device MD_D of FIG. 6 undertakes:
- at $D5_1$, the decoding of the data contained in the set $E_i$, on the basis of the first value V1: a quantity Q1 of syntax elements is then obtained, which represents a first characteristic of the decoded data,
- at $D5_2$, the decoding of the data contained in the set $E_i$, on the basis of the second value V2: a quantity Q2 of syntax elements is then obtained, which represents a second characteristic of the decoded data.

Steps $D5_1$ and $D5_2$ can be implemented in any order.

In the course of a step D6 of FIG. 4, there is undertaken, on the basis of the "reference_trace" information item, the selection of the value V1 or V2 of said at least one data item which is necessary for the decoding of the data contained in the set that is to say of the syntax element "greater_than_one" in the example represented.

Step D6 is implemented by a calculation device CAL_D represented in FIG. 6, which device is driven by the processor PROC_D.

Figure 5:
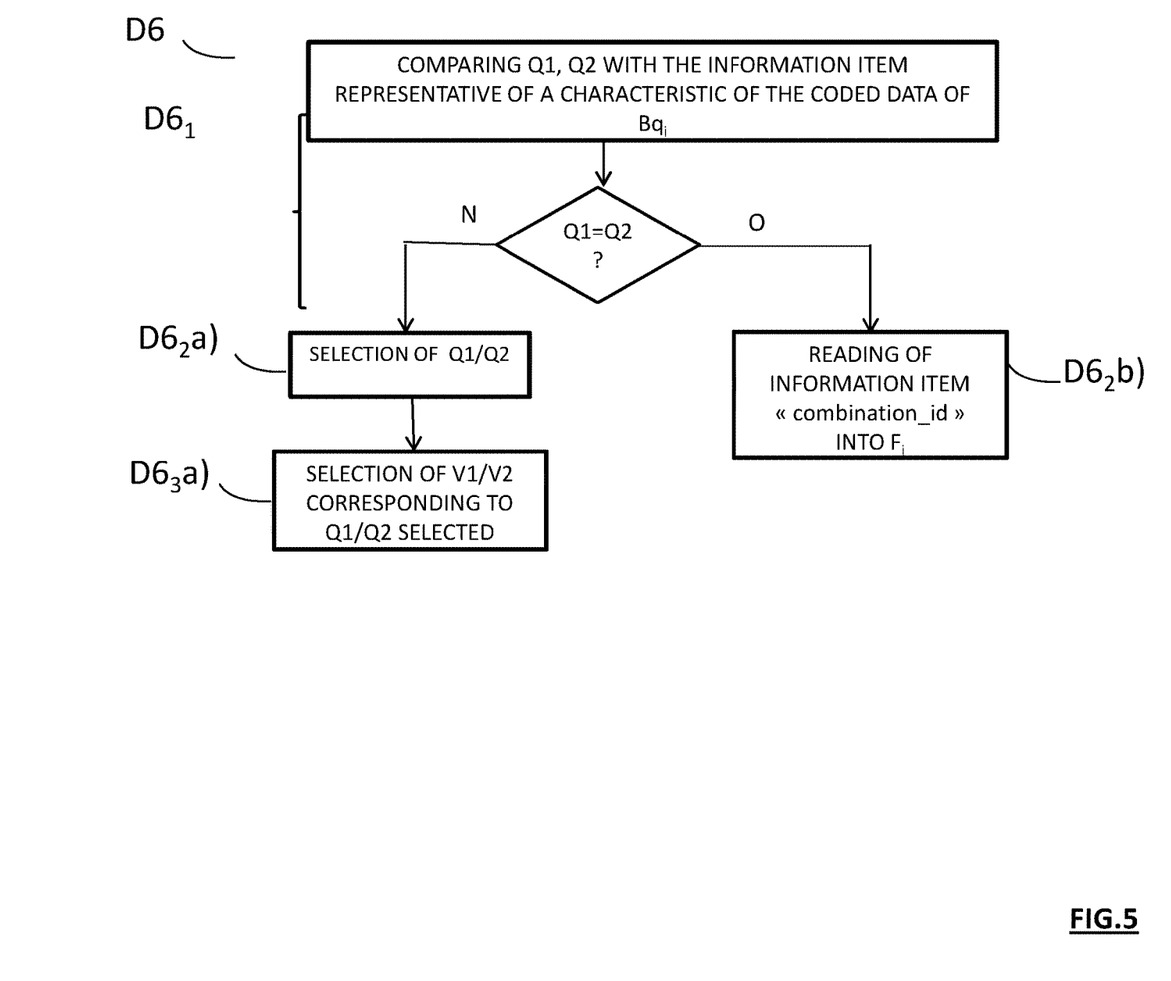
FIG. 5 represents in a detailed manner one of the steps of the decoding method of FIG. 4.

With reference to FIG. 5, step D6 proceeds in the following manner.

At $D6_1$, the calculation device CAL_D compares the quantity of syntax elements Q1 and the quantity of syntax elements Q2 with the "reference_trace" information item.

In the case where the quantities of syntax elements Q1 and Q2 are different:
- at $D6_2a$), the calculation device CAL_D undertakes the selection of the quantity of syntax elements Q1 or Q2 which is equal to the "reference_trace" information item,
- at $D6_3a$), the calculation device CAL_D undertakes the selection of the value V1 or V2 of said at least one data item necessary for the decoding of the coded data contained in the set $E_i$, which corresponds to the quantity of syntax elements Q1 or Q2 selected.

In the example represented, the value selected is the value V1 of the syntax element "greater_than_one".

In the case where the quantity of syntax elements Q1 and the quantity of syntax elements Q2 are both equal to the "reference_trace" information item, at $D6_2b$), the decoding device MD_D of FIG. 6 reads previously in the signal part $F_i$ the information item "combination_id", denoted $I_C$, representative of the selection of the value V1 of the syntax element "greater_than_one", such as made in the coding step C504b) of FIG. 2, and then optionally decompresses the information item "combination_id" if the latter was compressed on coding.

The decoding device MD_D then transmits the information item "combination_id" to the calculation device CAL_D or else the calculation device CAL_D requests this information item from the decoding device MD_D, when the quantity of syntax elements Q1 and the quantity of syntax elements Q2 are both equal to the "reference_trace" information item.

In the course of a step D7 of FIG. 4, the decoding device MD_D of FIG. 6 reconstructs the data of the data set $E_i$ on the basis of the value V1 or V2 selected.

On completion of step D7, there is then reconstructed the block of quantized coefficients $Bq_i$ which was obtained on completion of the quantization step C4 of FIG. 1.

We shall now describe an illustration of the decoding method which has just been described hereinabove.

In step D3, the information item representative of a characteristic of the data set $E_i$ which is determined is for example the "reference_trace" information item.

In the course of step D4 of FIG. 4, the decoding device MD_D decodes the syntax elements "significant_coeff" contained in the coded data set $E_i$ associated with the block $Bq_i$. On completion of this decoding, there is deduced the number of syntax elements "greater_than_one" which were not coded in step C51 of FIG. 1. If for example, there are four syntax elements "significant_coeff" which were decoded, on completion of step D4, the decoding device MD_D deduces therefrom, in a predetermined manner, that there are therefore four syntax elements "greater_than_one" to be decoded.

In the course of step D4, are then generated $2^4$ possible combinations of decoding values of the data of the block $Bq_i$, i.e. sixteen values V1, V2, . . . , V16, such as for example:

$$-V1 = \{0, 0, 0, 0\}$$
$$-V2 = \{0, 0, 0, 1\}$$
$$-V3 = \{0, 0, 1, 0\}$$
$$\dots$$
$$-V16 = \{1, 1, 1, 1\}.$$

In the course of step D5 of FIG. 4, the decoding device MD_D of FIG. 6 undertakes:
- at $D5_1$, the decoding of the data contained in the signal part $F_i$, on the basis of the first value V1: a quantity Q1 of syntax elements is then obtained, which represents a first characteristic of the decoded data,
- at $D5_2$, the decoding of the data contained in the signal part $F_i$, on the basis of the second value V2: a quantity Q2 of syntax elements is then obtained, which represents a second characteristic of the decoded data,
- at $D5_{16}$, the decoding of the data contained in the signal part $F_i$, on the basis of the sixteenth value V16: a quantity Q16 of syntax elements is then obtained, which represents a sixteenth characteristic of the decoded data.

In the course of step $D6_1$ of FIG. 5, each of the quantities Q1, Q2, . . . , Q16 of syntax elements is compared with the value of the "reference_trace" information item.

In the case where the sixteen quantities of syntax elements are all different from one another, in the course of step $D6_2a$) of FIG. 5 there is selected the quantity of syntax elements which is equal to the value of the "reference_trace" information item. In the example represented, it is the quantity of syntax elements Q7.

In the course of step $D6_3a$) of FIG. 5 there is selected the value V7, such as for example V7={0,1,1,0}, corresponding to the quantity of syntax elements Q7 which is selected.

In the case where at least two quantities of syntax elements are both equal to the "reference_trace" information item, for example Q2 and Q7, in the course of step $D6_2b$), the decoding device MD_D of FIG. 6 reads previously in the signal part $F_i$ the information item "combination_id", representative of the selection of the corresponding decoding value V7 which was implemented on coding, and then optionally decompresses the information item "combination_id" if the latter was compressed on coding.

In the course of step D7 of FIG. 4, the decoding device MD_D of FIG. 6 reconstructs the data of the coded data set $E_i$ on the basis of the selected value V7.

In the course of a step D8 of FIG. 4, there is undertaken a dequantization of the block of quantized coefficients $Bq_i$, according to a conventional dequantization operation which is the operation inverse to the quantization implemented during the quantization step C4 of FIG. 1. A current set of dequantized coefficients $BDq_i$ is then obtained on completion of step D8. Such a dequantization step is for example of scalar or vector type.

Step D8 is implemented by means of an inverse quantization device $MQ^{-1}\_D$, such as represented in FIG. 6, which device is driven by the processor PROC_D.

In the course of a step D9 represented in FIG. 4, there is undertaken the application of a transform to the current set of dequantized coefficients $BDq_i$ such as was obtained in the aforementioned step D8. In a manner known per se, such a transform is a transform inverse to that applied on coding on completion of step C3 of FIG. 1, such as for example a DCT, DST, DWT, LT or other transform. In a manner corresponding to the coder CO of FIG. 3, these transforms form part of a list $LTS^{-1}$ of transforms which is stored previously in the buffer memory MT_D of the decoder DO of FIG. 6. The type of separable transform to be applied is determined at the decoder by reading, in the data signal part $F_i$, the index $I_T$ of the transform applied on coding in the course of the aforementioned step C3 (FIG. 1).

On completion of step D9 there is obtained a block $BD_i$ of decoded data. In the example described here, data is intended to mean the pixels of the decoded block $BD_i$.

It should however be noted that data is also intended to mean the pixels of a decoded residual block in the case where a prediction of the current block $B_i$ was implemented on coding. In this case, a block $BD_i$ of decoded data is obtained after having implemented a prediction inverse to that implemented on coding.

Step D9 is implemented by a transform calculation device $MTR^{-1}\_D$, such as represented in FIG. 6, which device is driven by the processor PROC_D.

In the course of a step D10 represented in FIG. 4, said current reconstructed block $BD_i$ is written into a decoded image $ID_i$.

Such a step is implemented by an image reconstruction device URI such as represented in FIG. 6, said device being driven by the processor PROC_D.

The decoded image $ID_j$ is then delivered via the output SOR_D of the decoder DO of FIG. 6, in view for example of its display on a screen.

The decoding steps D1 to D10 which have just been described hereinabove are implemented for all the blocks $B_1, B_2, \ldots, B_i, \ldots, B_R$ to be decoded of the current image $IC_j$ considered, in a predetermined order which is for example lexicographic order.

It goes without saying that the embodiment which has been described hereinabove has been given purely by way of wholly nonlimiting indication, and that numerous modifications may easily be made by the person skilled in the art without however departing from the scope of the invention.

The invention claimed is:

1. A method for coding digital data in the form of a data signal, comprising the following acts performed by a coding device, for a current data set:
   coding the data of said set, with the exception of at least one data item of said set, to produce coded data,
   determining an information item representative of a characteristic of the coded data, said information item allowing reconstruction of all the data of said set,
   formulating at least one part of the data signal containing the coded data of said set,
   subsequent to the coding of the data of said set, with the exception of said at least one data item of said set, performing acts comprising:
   determining at least one first and one second value of at least one data item associated to said set and being not coded, said at least one data item being necessary for decoding the coded data,
   simulating a first type of decoding of the coded data contained in said at least one part of the data signal, on the basis of the first value of said at least one data item, on completion of which is obtained a first characteristic of the decoded data,
   simulating a second type of decoding of the coded data contained in said at least one part of the data signal, on the basis of the second value of said at least one data item, on completion of which is obtained a second characteristic of the decoded data,
   comparing each of said first and second characteristics of the decoded data with said information item representative of a characteristic of the coded data,
   selecting the first or the second value of said at least one data item necessary for the decoding of the coded data, based on said comparison, and
   transmitting the data signal from the coding device through a communication network.

2. A device for coding digital data in the form of a data signal,
   a processing circuit, which is configured to, for a current data set:
   code the data of said set, with the exception of at least one data item of said set, to produce coded data,
   determine an information item representative of a characteristic of the coded data, said information item allowing reconstruction of all the data of said set,
   formulate at least one part of the data signal containing the coded data of said set,
   and, subsequent to the coding of the data of said set, with the exception of said at least one data item of said set, to:
   determine at least one first and one second value of at least one data item associated to said set and being not coded, said at least one data item being necessary for decoding the coded data,
   simulate a first type of decoding of the coded data contained in said at least one part of the data signal, on the basis of the first value of said at least one data item, on completion of which is obtained a first characteristic of the decoded data,
   simulate a second type of decoding of the coded data contained in said at least one part of the data signal, on the basis of the second value of said at least one data item, on completion of which is obtained a second characteristic of the decoded data,
   compare each of said first and second characteristics of the decoded data with said information item representative of a characteristic of the coded data,
   select the first or the second value of said at least one data item necessary for the decoding of the coded data, based on said comparison, and
   transmit the data signal from the coding device through a communication network.

3. A non-transitory computer-readable recording medium on which is recorded a computer program comprising program code instructions for execution of a method for coding digital data in the form of a data signal, when the instructions are executed by a processor of a coding device, the method comprising the following acts performed by the coding device, for a current data set:

coding the data of said set, with the exception of at least one data item of said set, to produce coded data, determining an information item representative of a characteristic of the coded data, said information item allowing reconstruction of all the data of said set, formulating at least one part of the data signal containing the coded data of said set, subsequent to the coding of the data of said set, with the exception of said at least one data item of said set, performing acts comprising:

determining at least one first and one second value of at least one data item associated to said set and being not coded, said at least one data item being necessary for decoding the coded data, simulating a first type of decoding of the coded data contained in said at least one part of the data signal, on the basis of the first value of said at least one data item, on completion of which is obtained a first characteristic of the decoded data, simulating a second type of decoding of the coded data contained in said at least one part of the data signal, on the basis of the second value of said at least one data item, on completion of which is obtained a second characteristic of the decoded data, comparing each of said first and second characteristics of the decoded data with said information item representative of a characteristic of the coded data, selecting the first or the second value of said at least one data item necessary for the decoding of the coded data, based on said comparison, and transmitting the data signal from the coding device through a communication network.

4. A method for decoding a signal of coded digital data, wherein the method comprises the following acts performed by a decoding device, for at least one part of said signal containing a set of coded data:

receiving the coded digital signal from a communication network, determining an information item representative of a characteristic of the coded data which are contained in said at least one part of said signal, determining at least one first and one second value of at least one data item associated to said set and being not coded, said at least one data item being necessary for decoding the coded data of said at least one part of said signal, decoding the coded data contained in said at least one part of said signal on the basis of the first value of said at least one data item, on completion of which is obtained a first characteristic of the decoded data, decoding the coded data contained in said at least one part of said signal on the basis of the second value of said at least one data item, on completion of which is obtained a second characteristic of the decoded data, comparing each of said first and second characteristics of the decoded data with said information item representative of a characteristic of the coded data, selecting the first or the second value of said at least one data item, based on said comparison, reconstructing the data of said at least one part of said signal on the basis of the first or of the second value of said at least one data item, which has been selected.

5. The decoding method as claimed in claim 4, in which said first and second characteristics of the decoded data being different one from the other, said act of selecting the first or the second value of said at least one data item comprises selecting, from among the first and second characteristics of the decoded data, that which is equal to the information item representative of a characteristic of the coded data which are contained in said at least one part of said signal.

6. The decoding method as claimed in claim 4, in which the first and second characteristics of the decoded data being both equal to the information item representative of a characteristic of the coded data which are contained in said at least one part of said signal, said act of selecting the first or of the second value of said at least one data item which is necessary for the decoding of the data of said at least one signal part is implemented by determining, in said at least one part of said signal, an information item representative of the selection to be applied between the first or the second value.

7. A device for decoding a coded digital data signal, wherein the device comprises:

a processing circuit, which is configured to, for at least one part said signal containing a set of coded data:

receive the coded digital signal from a communication network, determine an information item representative of a characteristic of the coded data which are contained in said at least one part of said signal, determine at least one first and one second value of at least one data item associated to said set and being not coded, said at least one data item being necessary for the decoding of the data of said at least one part of said signal, decode data contained in said at least one part of said signal on the basis of the first value of said at least one data item, on completion of which is obtained a first characteristic of the decoded data, decode data contained in said at least one part of said signal on the basis of the second value of said at least one data item, on completion of which is obtained a second characteristic of the decoded data, compare each of said first and second characteristics of the decoded data with said information item representative of a characteristic of the coded data, select the first or the second value of said at least one data item, based on said comparison, and reconstruct the data of said at least one part of said signal on the basis of the first or of the second value of said at least one data item, which has been selected.

8. A non-transitory computer-readable recording medium on which is recorded a computer program comprising program code instructions for execution of a method for decoding a signal of coded digital data, when the instructions are executed by a processor of a decoding device, the method comprising the following acts performed by the decoding device, for at least one part of said signal containing a set of coded data:

receiving the coded digital signal from a communication network, determining an information item representative of a characteristic of the coded data which are contained in said at least one part of said signal, determining at least one first and one second value of at least one data item associated to said set and being not coded, said at least one data item being necessary for decoding the coded data of said at least one part of said signal, decoding the coded data contained in said at least one part of said signal on the basis of the first value of said at least one data item, on completion of which is obtained a first characteristic of the decoded data, decoding the coded data contained in said at least one part of said signal on the basis of the second value of said at least one data item, on completion of which is obtained a second characteristic of the decoded data, comparing each of said first and second characteristics of the decoded data with said information item representative of a characteristic of the coded data, selecting the first or the second value of said at least one data item, based on said comparison, and reconstructing the data of said at least one part of said signal on the basis of the first or of the second value of said at least one data item, which has been selected.

\* \* \* \* \*